Feb. 14, 1928.

R. R. STITT 1,658,951

EXPANSION VALVE

Filed Jan. 7, 1926

INVENTOR.
ROSCOE R. STITT
BY
ATTORNEY.

Patented Feb. 14, 1928.

1,658,951

UNITED STATES PATENT OFFICE.

ROSCOE R. STITT, OF DETROIT, MICHIGAN, ASSIGNOR TO STITT REFRIGERATION COMPANY, OF DETROIT, MICHIGAN, A CORPORATION OF MICHIGAN.

EXPANSION VALVE.

Application filed January 7, 1926. Serial No. 79,825.

This invention relates to an expansion valve and has for its object a construction in which is incorporated a minimum number of parts, quickness of assembly and cheapness of manufacture. Another object is that the operation of the valve is more easily and efficiently controlled.

Figures 1, 2:
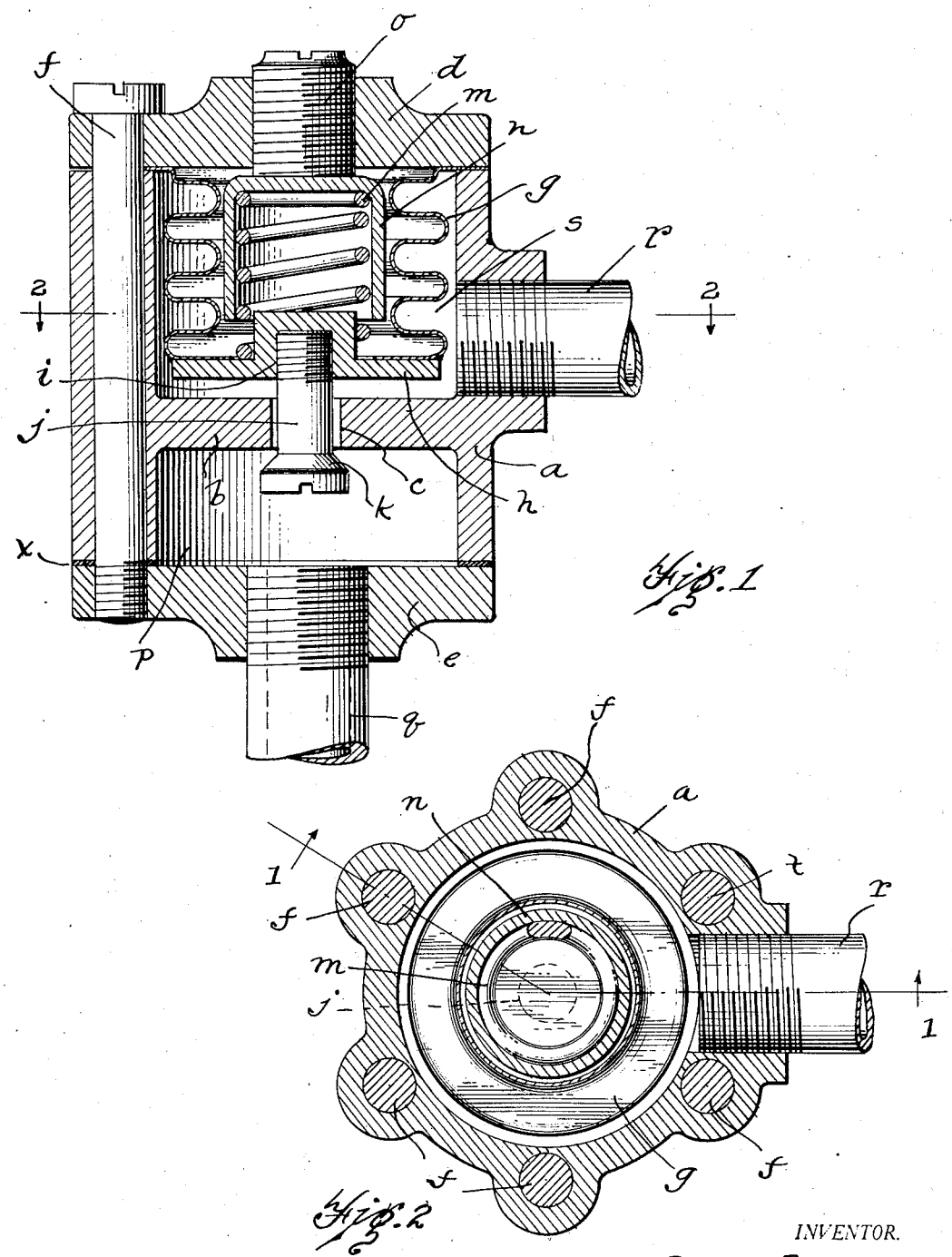
Fig. 1 is a sectional view through my improved form of expansion valve taken substantially on the line 1—1 of Fig. 2.
Fig. 2 is a section taken at right angles to that shown in Fig. 1 on the line 2—2 of Fig. 1.

This valve comprises a valve casing which consists of a casting $a$, open at both ends and provided with a partition wall $b$ having an opening $c$ therethrough. The end plates $d$ and $e$ are secured to the casting $a$ by means of the long studs $f$. Suitable gaskets $x$ are used so as to provide a leak proof joint therebetween. Soldered or otherwise secured to the end plate $d$ is a collapsible beliows $g$ which has the end plate $h$ secured on the free end. This plate $h$ is provided with a tapped recess $i$ in which is screwed the valve stem $j$ of a conical valve $k$. A spring $m$ inside of said bellows bears against the back of the plate $h$, the other end of the spring bearing against the cup-shaped spring retaining member $n$. An adjusting screw $o$ is screwed into the end plate $d$ and bears against the back of the cup-shaped spring retaining member. By turning the screw in or out, it is obvious that one can obtain an adjustment in the compresssive resistance of the spring $m$ to vary the resistance of the bellows against the pressure of the fluid externally applied to said bellows. As this spring $m$ tends to resist the collapsing of the bellows, it is obvious that the more compression that we place in the spring the greater force will be necessary to collapse the bellows. The collapsing of said bellows will close the opening $c$ by seating the valve $k$ on the valve seat. This bellows, or what is commonly known as a "sylphon", prevents the fluid from escaping by the adjusting screw, as the adjusting screw is secured in the end plate or wall $d$ of the valve casing and enters directly into the interior of the bellows, which is sealed off from the fluid refrigerant surrounding the bellows.

This expansion valve is particularly adapted for use in a refrigerating apparatus where it is desirable to regulate the pressure of the fluid in the expansion coils. The fluid enters into the chamber $p$ on one side of the partition $b$ through a pipe line $q$ leading from a source of supply. A conduit $r$ is in communication with the chamber $s$ on the other side of the partition $b$, the collapsible bellows or "sylphon" being located in this chamber $s$. This conduit $r$ when the device is used in a refrigerating apparatus, leads to the expansion coils where the fluid expands, due to the absorption of heat by the expansion coils.

As the fluid expands, there is a back pressure in the line, this pressure being applied to the external surface of the bellows and tending to collapse the same against the compression of the spring, which tends to close the opening $c$ and to prevent the admission of any more fluid. The fluid in the expansion coils is sucked through the refrigerating apparatus and obviously the pressure is reduced, unless some more fluid is permitted to enter. In practice, it is found that this valve will seek a balance and will permit just the exact amount of fluid to pass into the chamber $s$ so as to maintain a constant pressure in the conduit $r$ and in the chamber $s$ which is in communication therewith. Obviously, as a little more of the fluid is used in the refrigerating apparatus the pressure is reduced and the valve control means is actuated to open the valve so as to permit more fluid to enter or pass through the opening $c$ connecting the two chambers. Under normal conditions of operation it is found that there is very little variation in the position of the valve, while the apparatus is running. Because of the fact that this valve is connected directly to the collapsible bellows, an efficient adjustment and regulation of the valve may be had without endangering the loss of any of the refrigerant past the adjusting screw without the use of additional packing, and the valve is quickly responsive to any change in pressure of the fluid actuating the bellows.

I appreciate that it is not broadly new to utilize a sylphon in connection with an expansion valve and that there are numerous prior patents involving structures of this kind. However, most of these constructions, by reason of the arrangement of the valve, the valve guides and the springs, are subject to the difficulty of sticking due to the freezing of the valve on the seat, or the valve stem in the guide, etc. This is due to the inevitable presence of some moisture, probably water, in the refrigerant. With my arrangement, the valve is supported rigidly on the under side of the end plate of the sylphon and the valve stem is not guided except by the sylphon itself—it has considerable clearance through the opening in the partition wall $b$. The conical valve itself has only a line contact with the valve seat so that it is practically impossible for any frozen moisture to cause it to stick. I am enabled to provide such a construction by reason of enclosing the spring in the sylphon and placing the valve in the valve seat on the side of the partition remote from the sylphon. This permits the rigid seating of the valve itself in the end plate of the sylphon and does away with the necessity of a valve guide for the sylphon itself guides the valve.

It will be noted that the end plate $h$ of the sylphon is bossed up at the center. This has two purposes. One of them is to provide the necessary thickness to afford a tapped socket to receive the threaded valve stem, and the second purpose is to act as a centralizing seat for the coil spring. It is desirable to afford a socket for the threaded stem of the valve without penetrating the sylphon chamber so that the sylphon can be hermetically sealed off the expansion chamber from the atmosphere.

What I claim is:

1. In a fluid expansion valve, the combination of a valve casing provided with a chamber having an inlet and outlet port, a valve control unit within said chamber which comprises a collapsible bellows secured to one wall of the casing and hermetically sealed therewith and having a plate for closing the outer end of the bellows, a retaining cup housing and guiding the spring within the bellows, a compression spring within the bellows and which is seated in said cup and bears against the plate, and an adjusting screw in the wall of said casing arranged to engage the spring retaining cup, to adjust the compressive force of said spring to vary the resistance of said bellows to the pressure of the fluid externally applied to said bellows and a valve secured to said plate and arranged to be actuated by the movement of said bellows.

2. In a fluid expansion valve, the combination of a casing with a partition forming a low pressure side and a high pressure side, said partition provided with an opening, an annularly corrugated tube sealed into the low side chamber having a plate-like end bossed up at the center, a valve with a threaded stem screwing into said boss and passing through said opening and having a clearance with respect to said opening to prevent sticking, a coil spring contained within the said bellows-like tube and centered by said bossed up portion, a deep cup housing the spring above the cup and an adjusting screw passing through the casing and arranged to bring pressure on the spring opposite to the bossed portion.

In testimony whereof I have affixed my signature.

ROSCOE R. STITT.